INVENTORS
Thompson G. Bradley, &
Dominicus A. J. Swinkels
ATTORNEY

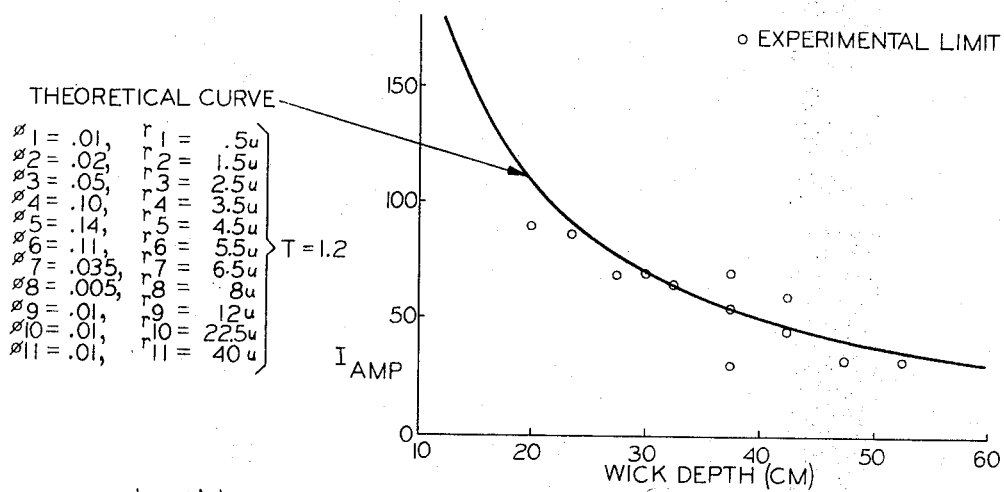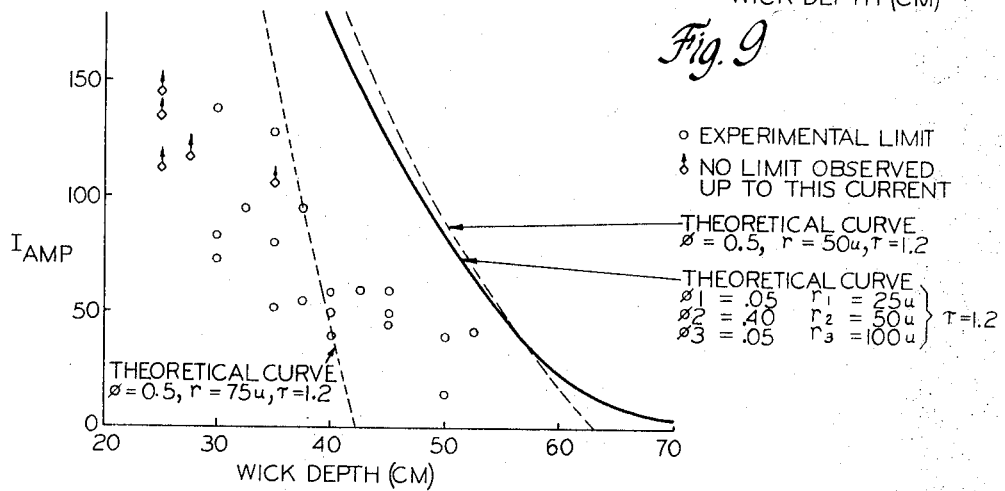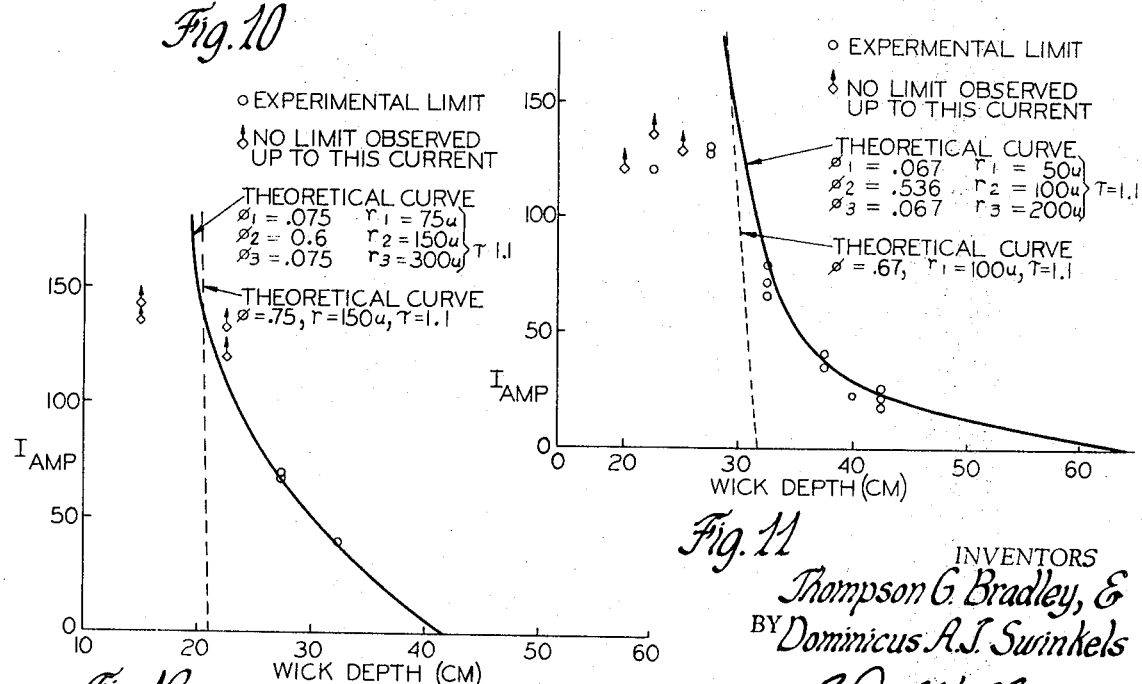

United States Patent Office 3,532,549
Patented Oct. 6, 1970

3,532,549
GALVANIC CELL SYSTEM AND METHOD OF DISCHARGING CELL
Thompson G. Bradley and Dominicus A. J. Swinkels, Indianapolis, Ind., assignors to General Motors Corporation, Detroit, Mich., a corporation of Delaware
Filed Oct. 27, 1966, Ser. No. 590,038
Int. Cl. H01m 29/04, 7/00
U.S. Cl. 136—86                             12 Claims

ABSTRACT OF THE DISCLOSURE

A combined electrode and liquid reactant transporting means for at least one liquid reactant of a galvanic cell system. A wick extends from within the cell region of the system into the liquid reactant storage region of the system. The wick is preferentially wet by the liquid reactant providing a plurality of capillary flow paths between the storage and cell regions of the system.

---

This invention relates generally to galvanic cell systems of the primary and secondary type and more specifically to fuel cells wherein at least one of the reactants (i.e., oxidant or reductant) is a liquid.

In fuel cells, electrode design is often the most critical design factor that must be considered. Electrode design alone often determines the size, weight, configuration and heat transfer characteristics of the final cell package. Additionally, the fuel cell system designer must consider appropriate means for transporting reactant from a storage region which is removed from the cell to that reactant's associated electrode for ultimate electrochemical consumption within the cell. In the past a variety of independent mechanical devices have been provided to transport the reactant. By our invention, we provide an electrode which includes its own reactant transport means and which permits the design of cells having excellent heat transfer characteristics whereby significantly improved cell and system design can be effected. Our invention permits the design of cells having short heat paths between the situs of the electrochemical reaction and the outer walls of the cell about which is circulated the temperature controlling medium.

It is, therefore, an object of our invention to provide in a galvanic cell system a combined electrode and reactant transporting means, which means conducts a liquid reactant from a remote storage region to the cell region of the system and in the cell region functions as the electrode for the thus conducted reactant.

It is a still further object of our invention to provide a process for discharging and recharging a galvanic cell system having a combined reactant transporting and reaction interface fixing means between a remote reactant storage region and the cell region of the system.

It is a still further object of our invention to provide an improved module design for a galvanic cell system which module integrates the principal components of the system into a unitized assembly which has excellent heat transfer characteristics and which provides a simple but effective liquid reactant capillary flow path for the transfer of the reactant to and from the cell region of the system.

These and other objects of our invention will become more apparent from the detailed description which follows.

Briefly stated, our invention comprehends a combined electrode and reactant transporting means for a galvanic cell system and an improved module design for the system. The invention is embodied principally in a porous conductive material which has a wetting affinity for a liquid reactant (i.e., oxidant or reductant) and which communicates a remote liquid reactant storage region with the cell region of a fuel cell system. We refer to our invention as a "wick electrode." The wick electrode is comprised principally of two portions which are preferably, though not necessarily, formed from a single piece of porous material. The material is preferably electrically conductive, but need not be if its associated reactant is itself conductive. One of the portions is located in the cell region of the system and actually performs the function of an electrode by supporting the liquid reactant in the cell in a fixed relationship to a counterelectrode and serving as the situs of the electrochemical reaction between the liquid reactant and the electrolyte. The other portion is merely an extension of the electrode portion and is comprised of a similar material. This latter portion extends from the electrode portion, into a liquid reactant storage region or reservoir which is removed from the cell. Owing to the preferred wetting by the liquid reactant, the entire wick including both portions is saturated to a degree dependent on the length of wick and its relation to gravitational forces. By capillary action the reactant will be transported down, up, or laterally through the wick, as appropriate, yet be held therein in a spaced relationship to the counterelectrode until electrochemically consumed from the electrode portion upon cell discharge. Upon discharge the capillary forces in the wick serve to transport additional reactant from the remote storage region to the electrode portion of the wick, hence providing more reactant to the cell region and maintaining the electrochemical reaction situs. As the reactant is electrochemically consumed, it is replaced by the additional reactant moving through the wick to fill the voids. On recharge the exact opposite of the foregoing occurs and the reactant is transported in the reverse direction back through the wick and into the storage region after plating out onto the wick.

FIGS. 9–12 show plots comparing the theoretical current obtainable to the actual current obtained for several stainless steel electrodes in a Li–LiCl environment.

Figure 1:
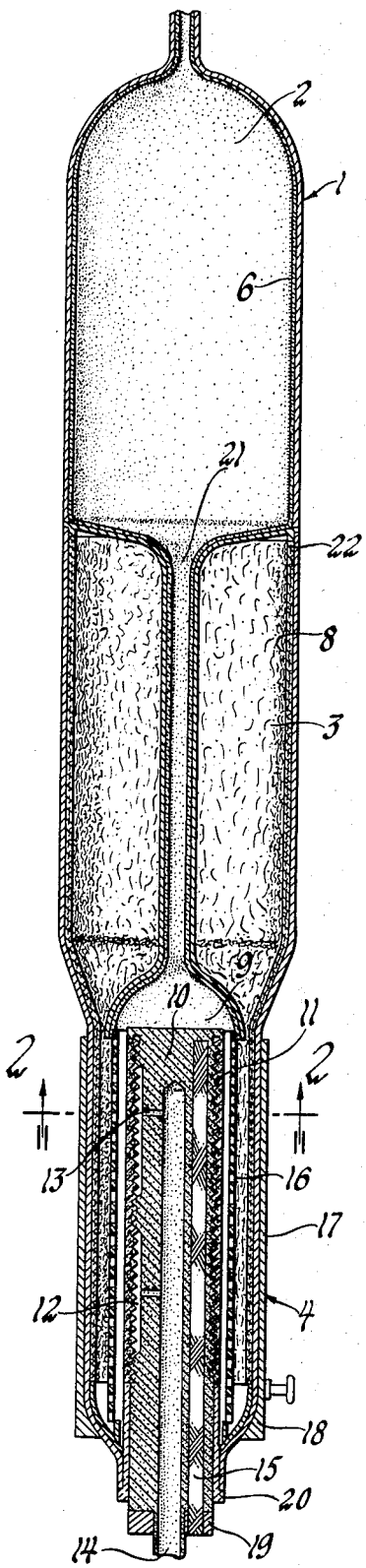
FIG. 1 shows a front sectional elevation of one embodiment of a device employing our invention.
Figure 2:
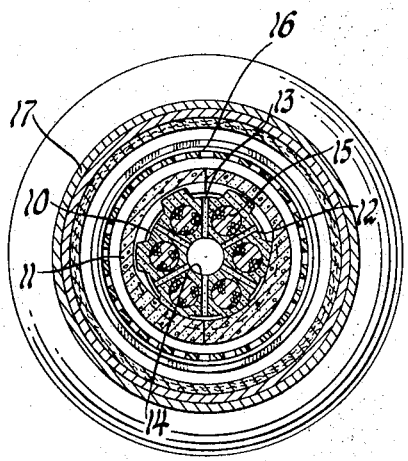
FIG. 2 shows a view of the device shown in FIG. 1 taken along section line 2—2.

FIG. 1 shows a sectional view of a preferred system employing the wick electrode of our invention. FIG. 1 shows a module designed for use in conjunction with a fuel cell system wherein the fuel is lighter than the electrolyte and more specifically for a Li/LiCl/Cl$_2$ fuel cell in which the Li is a reductant, the LiCl an electrolyte and the Cl$_2$ an oxidant. The module shown here comprises a pressure vessel or container 1 which houses in its upper portion the LiCl and Li storage regions 2 and 3, respectively. The Li storage region or reservoir 3 is an annular chamber contained within the lower half of the upper portion of the pressure vessel 1. A passage 21 formed by the inner annulus of the Li storage chamber 3 extends through the Li chamber 3 and communicates the cell region 4 with the LiCl storage region 2. In the cell region 4, which is in the lower portion of pressure vessel 1, the electrochemical consumption or dissociation takes place, as appropriate, to discharge or recharge, respectively. The upper portion of pressure vessel 1 and passage 21 are coated with an impervious ceramic coating 6. The impervious ceramic coating 6 serves two functions. The first function is the protection of the metal walls of the vessel from corrosive chemical attack. The second function is to provide a surface which is readily wet by the molten LiCl. A wick electrode 8 extends from within the Li storage chamber 3 into the cell region 4 thereby communicating by a flow path the one with the other. In the cell region 4 the wick electrode 8 functions as the anode. A $Cl_2$ counterelectrode 11 comprised of porous graphite is affixed to and supported by a dense graphite center member 10. The dense graphite center member 10 has an axially extending $Cl_2$ inlet 14. $Cl_2$ from the inlet 14 flows through the $Cl_2$ ports 13 to the annular passage 12 between the dense graphite 10 and the porous graphite electrode 11. A $Cl_2$ separator 16, which may be a screen comprised of a material which is inert to the attack of the cells constituents, is placed between the $Cl_2$ electrode 11 and Li wick electrode 8. The separator 16 effectively prevents the migration of any excess $Cl_2$, which bubbles through the porous graphite electrode 8, from chemically combining with Li. A copper sheath 17 is formed about the cell region 4. The lower portion 18 of sheath 17 is thicker than the rest of the sheath and serves as the Li electrode terminal. The copper sheath serves to more efficiently gather the current from the wick electrode and pressure vessel 1 while additionally serving as a heat sink. Stranded copper conductors 15 extend into the dense graphite center member 10 and like the copper sheath 17 serve to more efficiently gather and collect the current generated at the $Cl_2$ electrode 11. A copper disk 19 at the base of the dense graphite center member 10 is connected to the stranded copper conductors 15 and serves as a $Cl_2$ electrode contact. Ceramic insulators 20 serve to electrically isolate the anode from the cathode lest the cell be shorted out.

When fully charged, the storage region or reservoir 3 is full of lithium, the wick saturated with lithium and the cell region 4 full of electrolyte. To activate, the cell is heated to fuse the otherwise solid materials, chlorine admitted to the electrode 11 and an external circuit closed. As the lithium is consumed at the wick electrode, the volume of lithium in storage region 3 is reduced. Concurrently, the volume of lithium chloride increases. The volumetric rate of production of LiCl is almost twice the volumetric rate of depletion of the lithium. Therefore, via the open bottom of storage region 3, a portion of the LiCl replaces the Li lost from storage region 3. The balance of the LiCl formed fills the LiCl storage region 2 via passage 21. It should be noted then that for computation purposes the value $h$. for the height of the wick, must be considered from the furthest point (i.e., 22) from which the reactant must be transported during the discharge of the cell.

Figure 3:
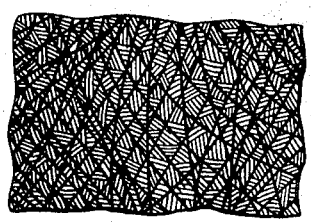
FIG. 3 shows an illustration of one material used in conjunction with our invention.

FIG. 3 shows a graphic illustration of one of the preferred materials used for the wick electrode 8. The material illustrated is fibermetal. It was purchased from Huyck Co. The fibermetal is comprised of compressed and sintered randomly oriented metallic fibers. The fibers range from 0.0004″ to about 0.010″. Almost any combination of fiber size, porosity and pore size to solve particular cell requirements could be fabricated from fibermetal, as will hereinafter be explained in detail.

Figure 4:
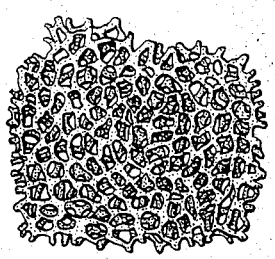
FIG. 4 shows an enlarged illustration of another material used in conjunction with our invention.

FIG. 4 is an illustration of another type of material for use as a wick electrode. FIG. 4 is a magnification of another material which is the product formed from the process of metallizing (e.g., nickel) a porous substrate such as a foam. If desired, the substrate may be subsequently removed leaving only the metallic residue which has taken on the structure of the substrate.

Two features of the wick electrode of our invention which are significant in terms of cell design are the maximum depth to which liquid reactant will wick against gravity and the rate at which it will wick to various depths. The depth, of course, is significant because it determines the amount of wick available as the electrode portion for a given head of reactant and electrolyte. The rate of flow is significant because it determines how much current can be supported by a given height, depth, or lateral length of wick.

The maximum or theoretical vertical depth to which a liquid reactant will wick is found by equating the surface tension forces and the hydrostatic forces for a capillary. For a cylindrical capillary, the maximum depth ($h$) may be represented by the equation $$h_o = \frac{2\sigma \cos \theta}{rg\Delta\rho} \qquad (1)$$

where $h_o$=maximum depth in cm.
$\sigma$=reactant-electrolyte interfacial tension (dynes/cm.).
$\theta$=contact angle.
$r$=pore radius (cm.) at interface.
$g$=981 cm./sec.$^{-2}$.
$\Delta\rho=\rho_E-\rho_R$ ($\rho$=density of material).

When the electrode material is preferably wet by the reactant to a high degree such that $\theta$ approaches zero and cos 0 approaches 1, the aforesaid equation reduces to $$h_o = \frac{2\sigma}{r981\Delta\rho} \qquad (2)$$

The rate at which the liquid reactant flows through a cylindrical pore is calculated using Poiseuille's equation.

$$V = \frac{r^2 \Delta P}{8\mu l} \qquad (3)$$

where v=velocity of flow (cm./sec.).
$\Delta P$=pressure difference across the tube.
$\mu$=viscosity of reactant (poise).
$l$=length of tube (cm.).
$r$=radium (cm.).

For a cylinder under zero gravity conditions the equation is:

$$\Delta P = \frac{2\beta}{r} \qquad (4)$$

For a cylinder under normal gravity conditions the equation is:

$$\Delta P = \frac{2\beta}{r} - gh\Delta e \qquad (5)$$

where $h$=the difference in level or depth of wicking.

Consistent with the foregoing, the rate at which a reactant will wick to various depths is calculated by $$w = Vm\rho_R \qquad (6)$$

where $w$=mass flow of reactant cm.$^2$/sec.
$m$=porosity of wick.

By appropriately combining Equations 3, 5 and 6 substituting $\tau h$ for $l$, the mass flow rate of reactant through the wick is calculated by $$w = \frac{m\rho_R r^2}{8\mu \tau h} \left( \frac{2\sigma}{r} - gh\Delta\rho \right)$$

where $\tau$=tortuosity of the pores.
$w$=mass flow rate of reactant in gram cm.$^2$/sec.

For a horizontal wick or under 0 gravity conditions, Equation 7 simplifies to $$w = \frac{r\sigma\rho_R m}{4\mu \tau h'}$$

where $h'$=the length of the wick.

To obtain the limiting current which can be supported by a wick having a cross sectional area (A) the following equation is applicable $$I = \frac{F}{\text{equiv. wt.}} \cdot \frac{m\rho_R r^2}{8\mu\tau h} \cdot A \cdot \left(\frac{2\sigma\cos\theta}{r} - ngh\Delta\rho\right)$$

where

F=Faraday constant—96490 coulombs/equivalent.
$m$=porosity.
$\rho_R$=density of reactant.
$r$=pore radius.
$\mu$=viscosity of reactant.
$\tau$=tortuosity of the wick.
$h$=wick depth.
$\sigma$=interfacial tension reactant-electrolyte.
$\theta$=contact angle between reactant and the wick material in the presence of the electrolyte.
$n$=number of times normal gravity.
$g$=acceleration due to gravity—981 cm./sec.$^{-2}$.
$\Delta\rho$=difference in density between reactant and electrolyte.

Figure 5:
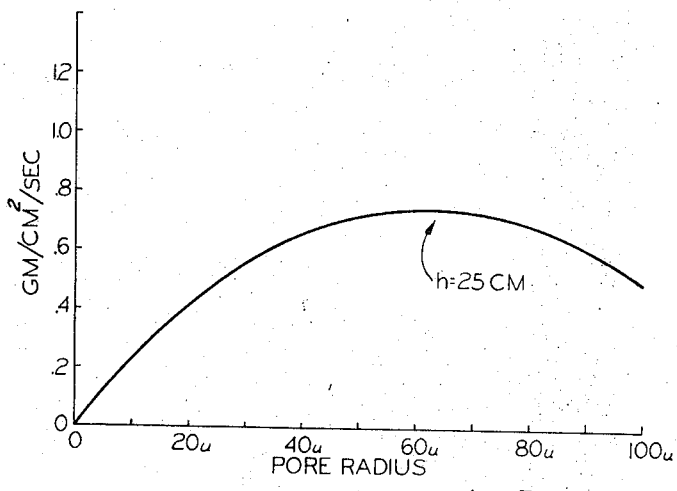
FIGS. 5 and 7 show a plot of the flow rate of lithium (Li) into lithium chloride (LiCl) through stainless steel as a function of pore size and depth.
Figure 6:
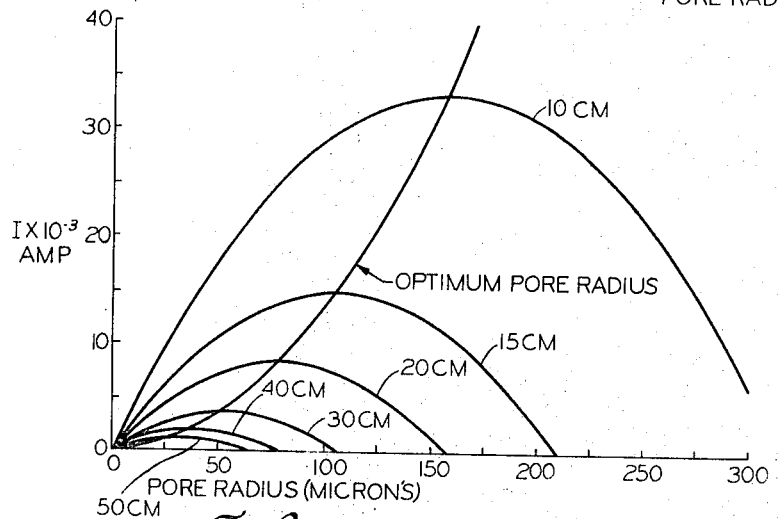
FIGS. 6 and 8 show a plot of the current which could be supported by Li in LiCl as a function of pore size and depth.
Figure 7:
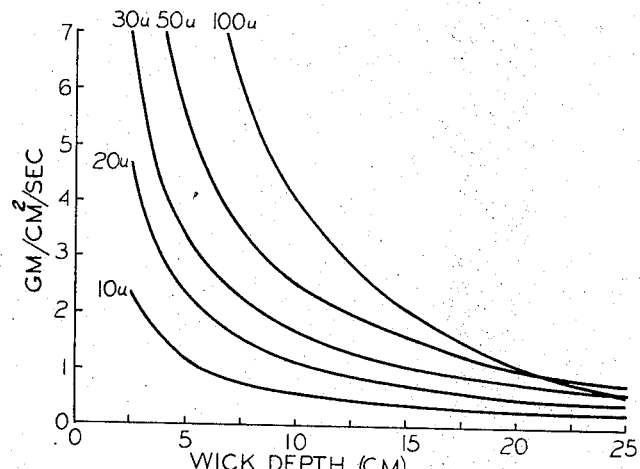
Figure 8:
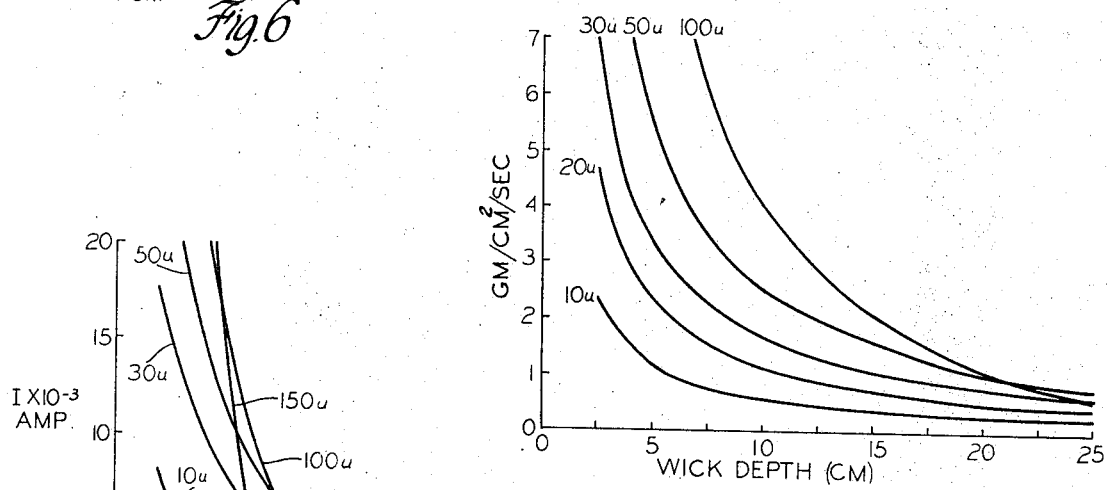

For an example of data from one particular system employing our invention, see FIGS. 5–12. This is a system where the liquid reactant is substantially immiscible with and has a specifiic gravity lower than the electrolyte. FIG. 7 shows a plot of $w\tau/m$ versus $h$ for Li in a Li/LiCl/Cl$_2$ fuel cell for various wick pore sizes. FIG. 5 shows that for a given depth $h$ of wick electrode there is an optimum pore radius ($r_{opt}$). For pores smaller than the optimum pore size, viscous flow is the limiting factor while for pores larger than small optimum, the surface tension driving force ($\Delta P$) is the limiting factor. Similarly, the limiting current supportable by a molten lithium reactant in a Li/LiCl/Cl$_2$ fuel cell may be computed by inserting as appropriate the variable values for porosity, pore size, depth of wick and tortuosity, the other values remaining substantially constant.

To illustrate our invention, molten Li was used as the liquid reactant and fused LiCl as the electrolyte. The test was conducted at 650° C. The wick material was a stainless steel randomly oriented interlocked structure of metallic fibers compressed and sintered to produce bonds at points where the fibers touch. This material might generally be described as fibermetal. Such material is sold under the trademark Feltmetal sold by Huyck Corporation. Hereafter when the generic term fibermetal is referred to and described, it will be in terms of Huyck Corporation's classification system. Fibermetal comes in a variety of materials including iron, nickel, cobalt, copper, precious metals and their alloys. We prefer to use stainless steel, but do not intend to limit ourselves thereto. For computation purposes, the following values were used:

F=96490 coulombs/equivalent of Li (equivalent weight of lithium=6.94 grams/equivalent)
$\rho_{Li}$=density of lithium 0.469 gm./cm.$^3$
$\mu$=viscosity of lithium—3.03×10$^{-3}$ poises
$\sigma$=interfacial tension Li-LiCl-157 dynes/cm.
$\theta$=contact angle between Li and the wick material in the presence of LiCl. (Known to be small, but for calculation purposes taken to be 0)
$\Delta\rho$=density difference between LiCl and Li=
$\rho_{LiCl} - \rho_{Li} = 1.484 - 0.469 = 1.015$ gm./cm.$^3$ Into Equation 9 were added the variable values of porosity, pore radius, tortuosity and wick depth as appropriate for the particular test sample. Equation 9 was used to calculate the theoretical current which could be supported by the wick material tested. The results of these calculations are found in FIGS. 6 and 8 where the theoretical current which is supportable by the Li flux is shown as a function of the pore radius and wick depth. It is noted that for any depth there is a pore radius ($r_{opt}$) for which the current is a maximum. By taking small $dI/dr$ increments of Equation 9, it is found that $$r_{opt} = \frac{\beta\cos\theta}{ngh\Delta\rho} \tag{10}$$

The curve corresponding to Equation 10 is shown on FIG. 6.

To determine the maximum flow rate attainable at each wick depth, the polarization characteristics of the wick were continually monitored. When the polarization of the electrode increased rapidly or otherwise drastically deviated from a linear E–I curve, it indicated that the Li was not flowing fast enough to support the current.

FIGS. 9, 10, 11 and 12 represent comparisons between the actual data obtained from tests and the theoretical data computed from Equation 9. Each theoretical curve is labeled with the variables used in its calculation. These variables represent the pore size distribution within a wick which nominally has only one pore size. This distribution was obtained by test with a porosimeter or from the manufacturer as appropriate. In some cases, no limiting currents were observed at the wick depth tested. These points have been plotted in FIGS. 10, 11 and 12 and are shown as diamonds with vertical arrows pointing toward infinite currents. The tortuosity of the fibermetal was estimated by extrapolating from the data of Winsauer et al., Bulletin of the American Association of Petroleum Geologists, 36, 253 (1952), who derived the formula $$\tau = 0.765 m^{-0.65} \tag{11}$$

for sand having porosity ranges 0.06–0.4.

Inasmuch as the fibermetal samples had porosities of greater than 0.4, the tortuosities used in the calculations were obtained by extrapolating Equation 11 to a tortuosity of one (1) at a porosity of one (1) and interpolating from the resultant curve.

FIG. 9 compares the results obtained from a fibermetal sample comprised of 347 stainless steel A30 fibers. The fibers had a diameter of 20 microns. The test sample had a porosity of 0.5, a nominal pore radius of 5 microns and a cross sectional area of 0.12 cm.$^2$. The theoretical I–h curve was calculated using the 11 pore radius-porosity combinations indicated on the chart. This pore size distribution was measured experimentally using an Hg porosimeter. The encircled points represent the data actually obtained from a wick having a cross sectional area of 0.12 cm.$^2$.

FIG. 10 compares the results obtained from a fibermetal sample comprised of 347 stainless steel C38 fibers. The fibers had a diameter of 0.004 inch. The test sample had a porosity of 0.5 and a nominal pore radius of 50 microns. According to the manufacturer, a nominal pore size of X microns has the meaning that 80% of the pores lie between $$\frac{X}{2 \text{ microns}} \text{ and } 2X \text{ microns}$$

Therefore, as an approximation of the pore size distribution used to calculate the theoretical curves in this figure and also FIGS. 11 and 12, the following distribution was assumed:

$$10\% @ \frac{X}{2 \text{ microns}}$$

$$80\% @ \frac{X}{X \text{ microns}}$$

$$10\% @ 2X \text{ microns}$$

Also shown on FIG. 10 are the theoretical curves (dashed) for phantom samples having a single pore size of either 50 microns or 75 microns. Hence for the phantom calculations, no pore size distribution was considered. There is no explanation why this particular test did not show the same excellent agreement between the experimental points and the theoretical computations as did the other tests (see FIGS. 9, 11 and 12). However, the same general trend toward lower currents at greater depths is nonetheless apparent.

FIG. 11 depicts similar information developed for fibermetal having 0.004 inch diameter C38 fiber comprised of 347 stainless steel. The sample had a porosity of 0.67 and a nominal pore radius of 100 microns. Excellent agreement between the theoretical curve and the experimental points was noted.

FIG. 12 is data from still another test conducted using fibermetal employing C38 fibers of 347 stainless steel. The fibers had a diameter of 0.004 inch. This sample had a porosity of 0.75 and a nominal pore radius of 150 microns. Again, as in FIGS. 9 and 11, the excellent agreement between experimental data and theoretical data was noted.

FIGS. 11 and 12 demonstrate the importance that must be placed on the consideration of pore size distriubtion in making the calculations. It can be seen that for substantial agreement between theory and experiment, this factor must be considered. FIGS. 11 and 12 illustrate this in terms of the differences between the theoretical curve based on a pore size distribution and the theoretical curves based on single pore sizes.

While we have disclosed our invention primarily in terms of a preferred embodiment thereof, we do not intend to be limited thereby except as defined in claims which follows.

We claim:

1. An electrochemical system comprising a galvanic cell including an electrolyte and two electrodes for electrochemically reacting oxidizing and reducing reactants at least one of which reactants is a liquid, a region between said electrodes for said electrolyte, a reservoir containing said liquid reactant remote from said cell, a porous, wick-like, reactant-wetted reactant-transporting, reactant-supporting member extending from within said cell to said reactant in said reservoir, a first conductive portion of said member in said cell corresponding to one of said electrodes and supporting said reactant in said cell, and a second portion of said member extending from said first portion into contact with said reactant in said reservoir to continuously supply said reactant by capillary action from said reservoir to said first porous portion in said cell whereat said first portion supports said liquid in a spaced relation to the other of said electrodes and serves as the situs of the electrochemical reaction interface between said reactant and the electrolyte.

2. The galvanic cell system claimed in claim 1 wherein the pore size of said member is approximately equal to $$r = \frac{\sigma \cos \theta}{ngh\Delta\delta}$$

wherein $r$, $\sigma$, $\theta$, $n$, $g$, $h$ and $\Delta\rho$ are in such terms as heretofore set forth in this specification in conjunction with Equation 10.

3. The system claimed in claim 1 wherein said electrode for said reactant will, for any given depth in said electrolyte, support a current of at least approximately $$I = \frac{F}{\text{EQUIV. Wt.}} \cdot \frac{m\rho_R r^2}{8\mu\tau h} \cdot A \cdot \left(\frac{2\sigma \cos \theta}{r} - ngh\Delta\rho\right)$$

wherein I, F, $m$, $\rho_R$, $r$, $\mu$, $\tau$, $h$, A, $\sigma$, $\theta$, $n$, $g$ and $\Delta\rho$ are in such terms as heretofore set forth in this specification in conjunction with Equation 9.

4. The system claimed in claim 1 wherein said liquid reactant is a reductant selected from the group consisting of molten alkali metals, said oxidizing reactant is a gas selected from the group consisting of halogens, and said electrolyte is a fused alkali metal halide.

5. The system claimed in claim 4 wherein said member comprises randomly oriented, compressed and sintered metallic fibers.

6. The system as claimed in claim 5 wherein said fibers are stainless steel.

7. The system claimed in claim 6 wherein said alkali metal is lithium, said halogen is chlorine, and said electrolyte is lithium chloride.

8. The system claimed in claim 7 wherein the pore size of said compressed and sintered stainless steel fibrous porous material is approximately equal to $$r = 0.157(nh)^{-1}$$

wherein $r$, $n$ and $h$ are in such terms as heretofore set forth in this specification in conjunction with Equation 10.

9. A module for an electrochemical system comprising an elongated container, a galvanic cell having an electrode and a counterelectrode for the electrochemical consumption of an oxidant and reductant in the presence of an electrolyte which is the reaction product of said oxidant and reductant, at least one of said oxidant and reductant being a liquid, a reservoir for containing said liquid, a storage region for said reaction product and capillary transport means wettable by said liquid extending between said cell and said reservoir for conducting said liquid into and out of said cell by capillary action, and wherein said reservoir, said product storage region and said cell are contained in said container and generally axially aligned along the principal axis of said elongated container.

10. The device as claimed in claim 9 wherein said capillary transport means for conducting said liquid into and out of said cell is a wick having a porous conductive portion in said cell corresponding to the one of said electrodes for said liquid and a second porous portion of said wick extending from said first portion into said reservoir to provide paths for the flow of said liquid by capillary action from said reservoir to said first portion in said cell, whereat said first portion supports said liquid in said cell and serves as the situs of the electrochemical reaction interface between the liquid and the electrolyte.

11. The device as claimed in claim 10 wherein said wick is generally cylindrical in shape and conducts said liquid principally along the inner wall of said vertical container.

12. A process for discharging a galvanic cell in which at least one of the components of the cell's oxidant-reductant electrochemical couple is a liquid, said process comprising the steps of providing said cell with an electrode for said liquid, a counterelectrode for the other component of said couple, an electrolyte between said electrodes and wick means for transporting said liquid into said cell, which wick means is preferentially wetted by said liquid and comprises a first conductive portion corresponding to said electrode for said liquid for supporting said liquid in said cell and a second porton of said wick extending from said first portion out of said cell to a source of said liquid, closing an external electrical circuit between said electrode and said counterelectrode, electrochemically consuming said liquid at said first portion and flowing said liquid by capillary action through said wick from said source into said cell to replenish said liquid consumed at said electrode.

References Cited

UNITED STATES PATENTS

| | | | |
|---|---|---|---|
| 2,988,584 | 6/1961 | Peters | 136—144 X |
| 3,266,936 | 8/1966 | Krebs | 136—36 X |
| 3,328,205 | 6/1967 | Barber et al. | 136—86 |
| 3,364,071 | 1/1968 | Kordesch | 136—86 |

ALLEN B. CURTIS, Primary Examiner

U.S. Cl. X.R.

136—120, 162

PO-1050
(5/69)

UNITED STATES PATENT OFFICE
CERTIFICATE OF CORRECTION

Patent No. 3,532,549    Dated  October 6, 1970

Inventor(s) T. G. Bradley et al

It is certified that error appears in the above-identified patent and that said Letters Patent are hereby corrected as shown below:

Column 4, between lines 40 and 45, that portion of equation (4) reading $$\frac{2\beta}{r} \quad \text{should read} \quad \frac{2\sigma}{r}$$

Between lines 45 and 50, that portion of equation (5) reading $$\frac{2\beta}{r} - gh\Delta e \quad \text{should read} \quad \frac{2\sigma}{r} - gh\Delta\rho$$

line 55, after "flow" insert -- rate --;

in lines 60 and 70, respectively, after the equations, insert the numerals -- (7) and (8) -- respectively.

Column 5, lines 3 and 4, after the equation, insert the numeral -- (9) --; in line 15, "$\epsilon$ = interfacial" should read --$\sigma$ = interfacial --.

Column 6, between lines 1 and 5, that portion of equation (10) reading $$\frac{\beta \cos \theta}{ngh\Delta\rho} \quad \text{should read} \quad \frac{\sigma \cos \theta}{ngh\Delta\rho}$$

Column 7, line 17, "distriubtion" should be -- distribution --; line 52, that portion of the equation reading $$\frac{\sigma \cos \theta}{ngh\Delta\delta} \quad \text{should read} \quad \frac{\sigma \cos \theta}{ngh\Delta\rho}$$

Signed and sealed this 20th day of April 1971.

(SEAL)
Attest:

EDWARD M. FLETCHER, JR.        WILLIAM E. SCHUYLER, JR.
Attesting Officer              Commissioner of Patents

PO-1050
(5/69)

UNITED STATES PATENT OFFICE
CERTIFICATE OF CORRECTION

Patent No. 3,532,549            Dated October 6, 1970

Inventor(s) T. G. Bradley et al

It is certified that error appears in the above-identified patent and that said Letters Patent are hereby corrected as shown below:

Column 4, line 24, the "0" should read -- $\theta$ --.

line 55, "cm.$^2$/sec." should read

-- $\dfrac{g\ cm^2}{sec}$ --.

Signed and sealed this 17th day of August 1971.

(SEAL)
Attest:

EDWARD M. FLETCHER, JR.          WILLIAM E. SCHUYLER, JR.
Attesting Officer                 Commissioner of Patents